United States Patent
Kerr et al.

(10) Patent No.: US 11,710,149 B2
(45) Date of Patent: Jul. 25, 2023

(54) SYSTEM AND METHOD FOR ACTIVITY SUMMARY AND PRODUCT PROMOTION

(71) Applicant: Loxa Beauty, Carmel, IN (US)

(72) Inventors: David Kerr, Carmel, IN (US); Danielle McDowell, Indianapolis, IN (US)

(73) Assignee: BEAUTY SYSTEMS GROUP LLC, Denton, TX (US)

( * ) Notice: Subject to any disclaimer, the term of this patent is extended or adjusted under 35 U.S.C. 154(b) by 983 days.

(21) Appl. No.: 14/194,658

(22) Filed: Feb. 28, 2014

(65) Prior Publication Data

US 2014/0249920 A1 Sep. 4, 2014

Related U.S. Application Data

(60) Provisional application No. 61/771,539, filed on Mar. 1, 2013.

(51) Int. Cl.
*G06Q 20/12* (2012.01)
*G06Q 30/0251* (2023.01)
*G06Q 10/10* (2023.01)

(52) U.S. Cl.
CPC ......... *G06Q 30/0255* (2013.01); *G06Q 10/10* (2013.01)

(58) Field of Classification Search
CPC ............... G06Q 30/0255; G06Q 10/10; G06Q 30/00–30/0284
See application file for complete search history.

(56) References Cited

U.S. PATENT DOCUMENTS

| | | | | |
|---|---|---|---|---|
| 2003/0065524 A1* | 4/2003 | Giacchetti | ............ | A45D 44/005 700/49 |
| 2003/0065526 A1* | 4/2003 | Giacchetti | ............ | A45D 44/005 382/276 |
| 2005/0256733 A1* | 11/2005 | Nagai | ............ | G06Q 30/02 705/1.1 |
| 2009/0043674 A1* | 2/2009 | Minsky | ............ | G06Q 30/0603 705/26.8 |
| 2009/0063290 A1* | 3/2009 | Mehew | ............ | G06Q 30/0641 705/28 |
| 2010/0306040 A1* | 12/2010 | Arumugam | ............ | G06Q 30/02 705/14.16 |

(Continued)

OTHER PUBLICATIONS

Providing access to a plurality of service providers utilizing a single interface , p. 7, ip.com authors et al. (Year: 2006).*

*Primary Examiner* — Ilana L Spar
*Assistant Examiner* — Darnell A Pouncil
(74) *Attorney, Agent, or Firm* — Alston & Bird LLP

(57) ABSTRACT

A method, apparatus, and computer readable medium for facilitating communication between a merchant and a client are provided. An example method may include creating a beautician identification record for a beautician, receiving an information related to an interaction between the beautician and a client, determining at least one product or service for the client from the information, and creating, using a processor, a communication to the client. The communication may include an indication of the at least one product or service. The method may also include sending the prescription to the client. Example systems, apparatuses, and computer readable media are also provided.

20 Claims, 13 Drawing Sheets

(56) References Cited

U.S. PATENT DOCUMENTS

2014/0244442 A1\* 8/2014 Hirsch ............... G06Q 30/0633
  705/26.62
2015/0278917 A1\* 10/2015 Stoll .................. G06Q 30/0635
  705/26.7
2017/0372283 A1\* 12/2017 Killoran, Jr. ....... G06Q 30/0253

\* cited by examiner

SYSTEM AND METHOD FOR ACTIVITY SUMMARY AND PRODUCT PROMOTION

CROSS-REFERENCE TO RELATED APPLICATIONS

This application claims priority to U.S. Provisional Application No. 61/771,539, filed Mar. 1, 2013, the entire contents of which are incorporated herein by reference.

TECHNOLOGICAL FIELD

Example embodiments of the present invention relate generally to managing relationships between a merchant and consumers and, more particularly, to a method, system, and apparatus for facilitating communication between a merchant and a consumer regarding product suggestions, purchases, appointments, and other interactions.

BACKGROUND

Beauticians work closely with each client to create a look that makes the client feel his or her best. Every client, however, is completely different in both personality and physical makeup when compared to another client, and the beautician is required to try various styles, products, and techniques in order to find that perfect look.

A major problem for clients is that they cannot afford to see their beautician each and every day. Although a trip to the salon might create for a perfect hair day, it is very difficult for the average person to recreate that look on days when he or she cannot see their beautician. As such, men and women spend days in between trips to the salon trying to recreate that look. However, these men and women may have no idea what products were used on them while at the salon and may not know where to even get these products except with another trip to that salon.

Moreover, beauticians may not want to keep large quantities of inventory within their salons, especially if the beautician is working independently or traveling from place to place. The beautician, though, may recommend products to his or her clients to use in between sessions at the salon, and the beautician, today, may not be compensated for purchases of those products by his or her clients.

Accordingly, there exists a need for a system and method to provide activity summary and product promotion that can enable clients to know what products to buy in between sessions to the salon and give beauticians promoting those products compensation for purchases made from their recommendations outside of the salon.

BRIEF SUMMARY

A method, apparatus and computer program product are therefore provided according to an example embodiment of the present invention in order to provide for improved communication between merchants and consumers. Embodiments may include a method for facilitating interaction between merchants and consumers. The method may include creating a beautician identification record for a beautician, receiving an information related to an interaction between the beautician and a client, determining at least one product or service for the client from the information, and creating, using a processor, a communication to the client. The communication may include an indication of the at least one product or service. The method may also include sending the communication to the client. In some embodiments, the method may also include compensating the beautician based on one or more purchases of the recommended products and services by the client. The communication may include at least one interface control that, when selected by the client, facilitates a purchase of the product or service by the client. The at least one interface control may be a link to the product on an e-commerce website. In some embodiments, the interaction may include an offering of the at least one product or service to the client by the beautician. The beautician identification record may be linked to the client. The method may also include creating a client identification record for the client, and, in response to receiving the information related to the interaction, linking the client identification record to the beautician identification record. The client identification record may include at least one photograph of the client's hair style. The communication may include a prescription for using the at least one product or service.

Example embodiments may also provide an apparatus for providing activity summary and product promotion. The apparatus may include a processor coupled to a memory, wherein the memory comprises instructions that, when executed by the processor, configure the apparatus. The instructions may configure the apparatus to create a beautician identification record for a beautician, receive an information related to an interaction between the beautician and a client, determine at least one product or service for the client from the information, and create a communication to the client. The communication may include an indication of the at least one product or service. The apparatus may also be configured to send the communication to the client. The apparatus may be further configured to compensate the beautician based on one or more purchases of the at least one product or service by the client. The communication may include at least one interface control that, when selected by the client, facilitates a purchase of the product or service by the client. The at least one interface control may be a link to the product on an e-commerce website. The interaction may include an offering of the at least one product or service to the client by the beautician. The beautician identification record may be linked to the client. In some embodiments, the apparatus may be further configured to create a client identification record for the client, and to, in response to receiving the information related to the interaction, link the client identification record to the beautician identification record. The client identification record may include at least one photograph of the client's hair style. The communication may include a prescription for using the at least one product or service.

A non-transitory computer readable storage medium including instructions that, when executed by a processor, cause the processor to configure an apparatus to create a beautician identification record for a beautician, receive an information related to an interaction between the beautician and a client, determine at least one product or service for the client from the information, and create a communication to the client. The communication may include an indication of the at least one product or service. The instructions may also cause the processor to configure the apparatus to send the prescription to the client. The instructions may further configure an apparatus to compensate the beautician based on one or more purchases of the recommended products and services by the client.

BRIEF DESCRIPTION OF THE DRAWINGS

Figure 1:
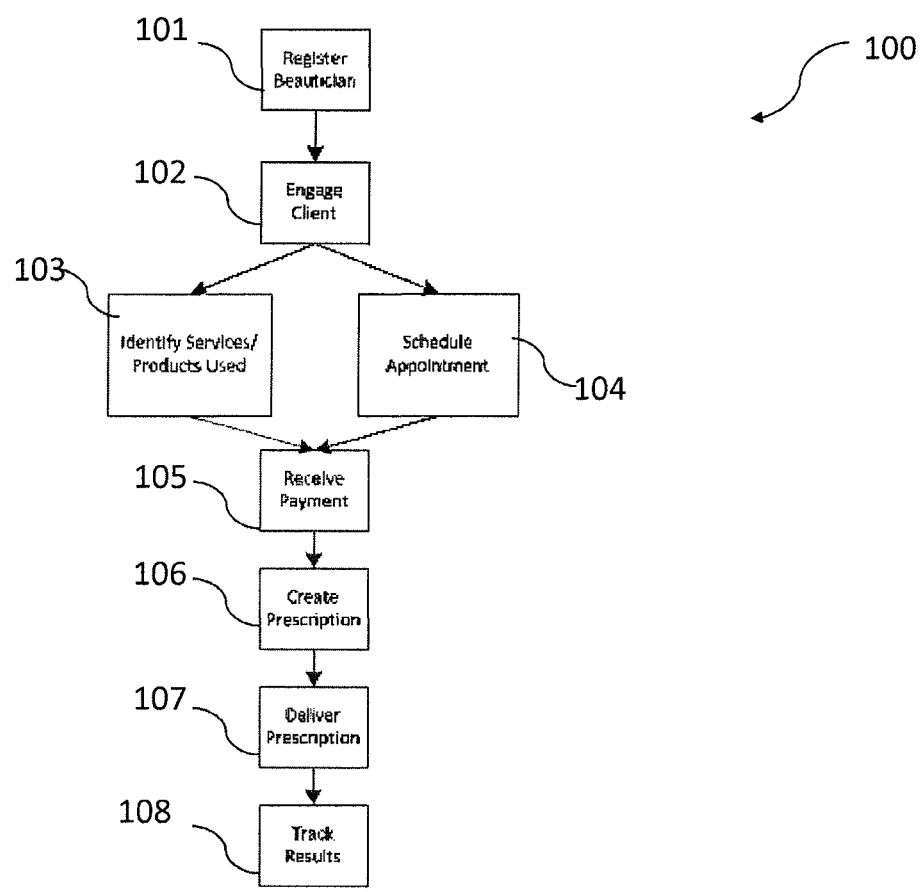
Figure 2:
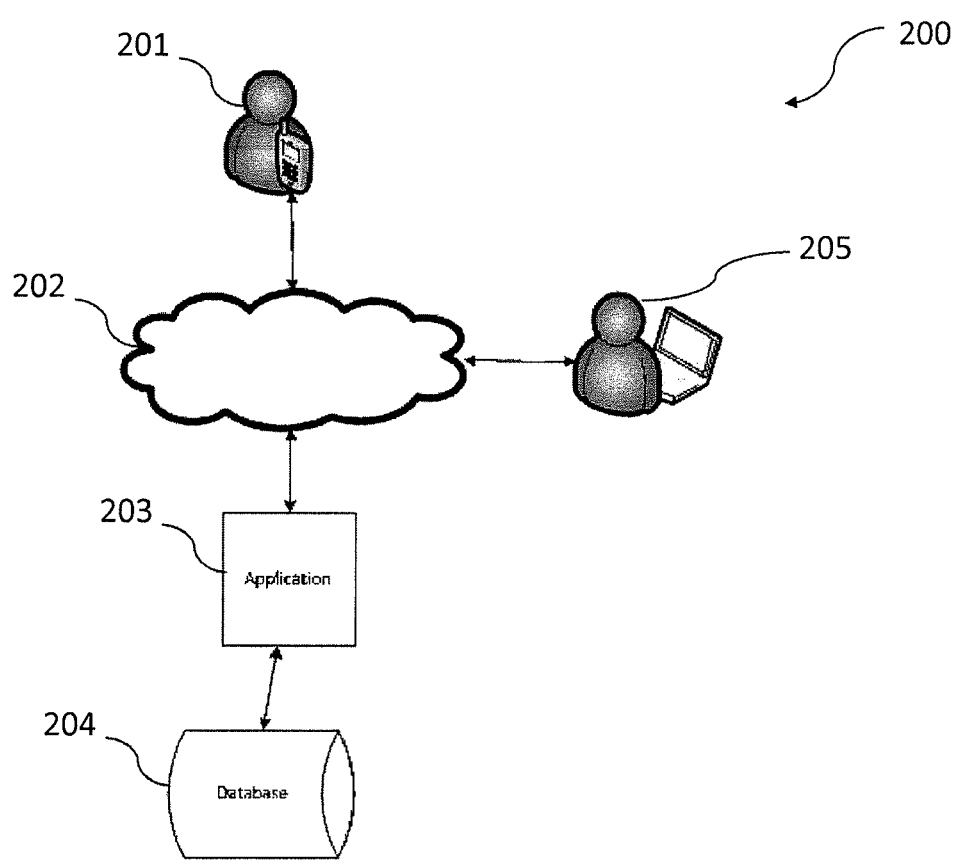
Figure 3:
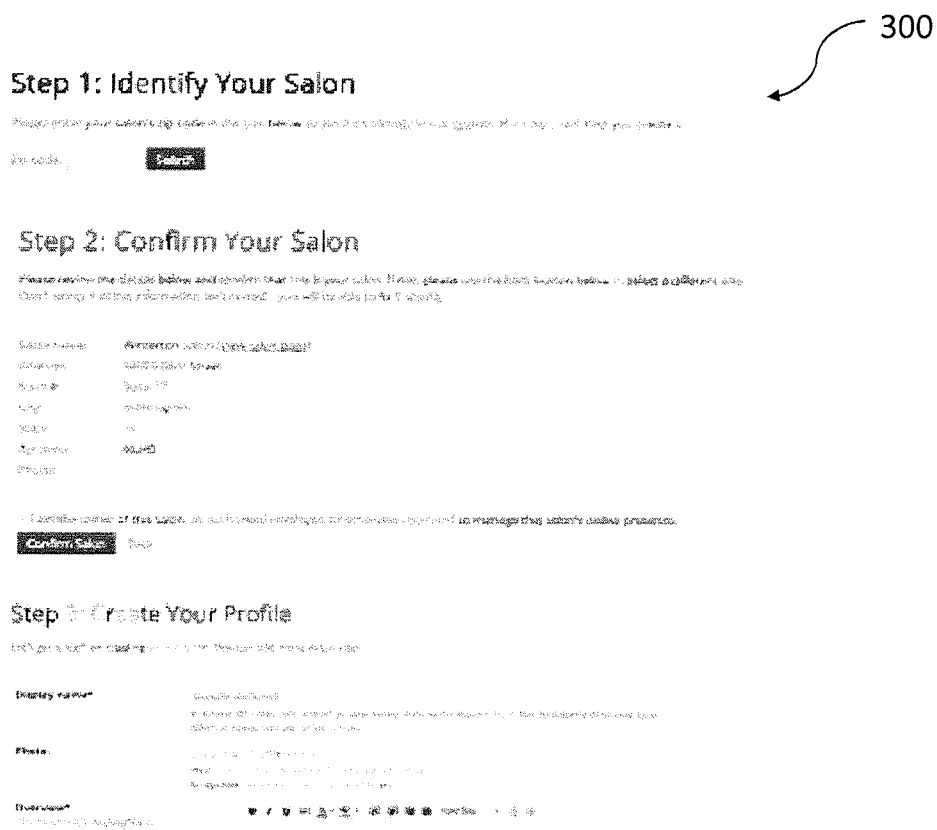
Figure 4:
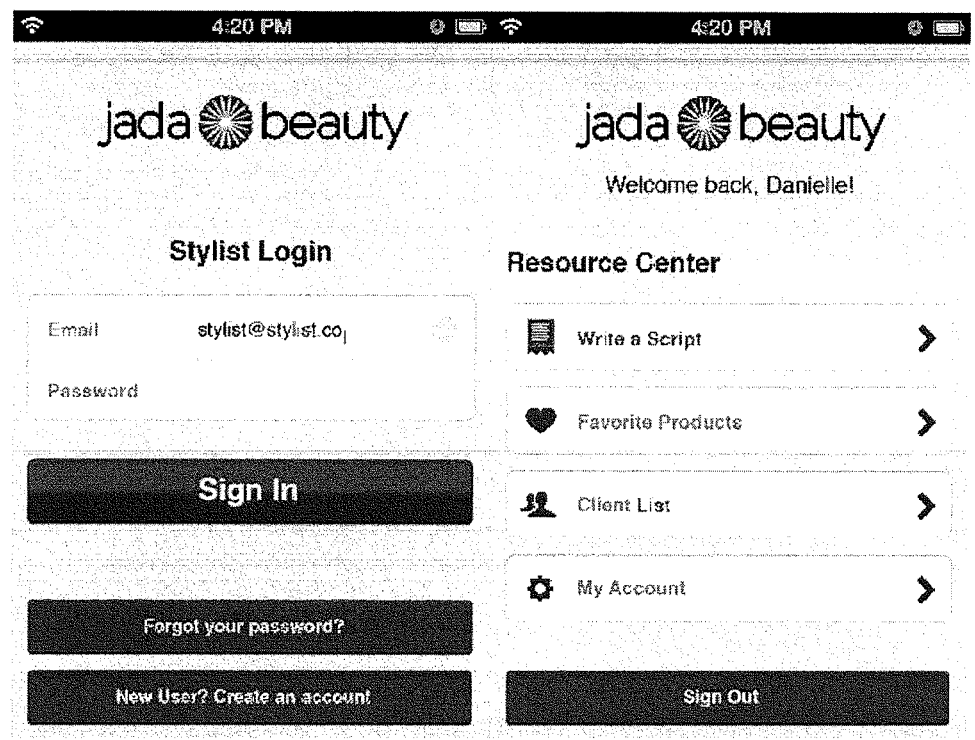
Figure 5:
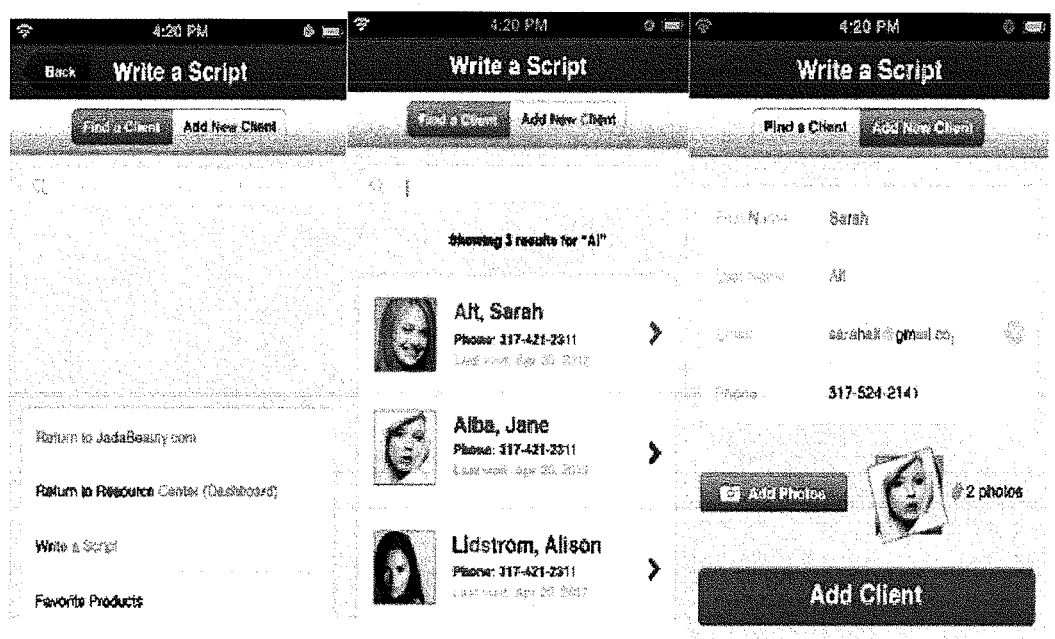
Figure 6:
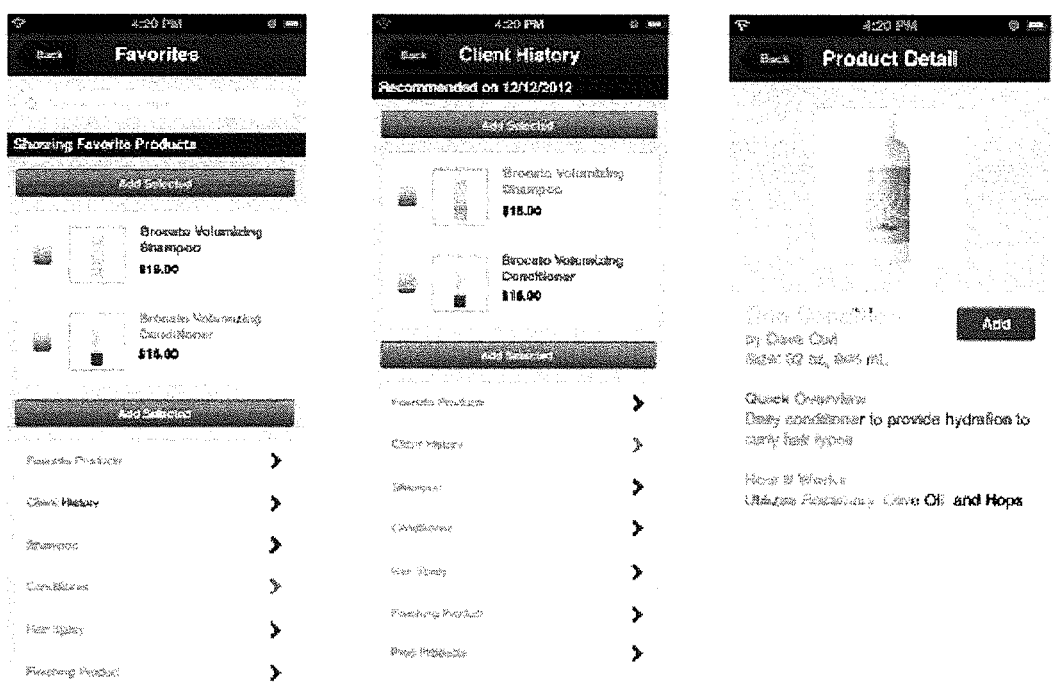
Figure 7:
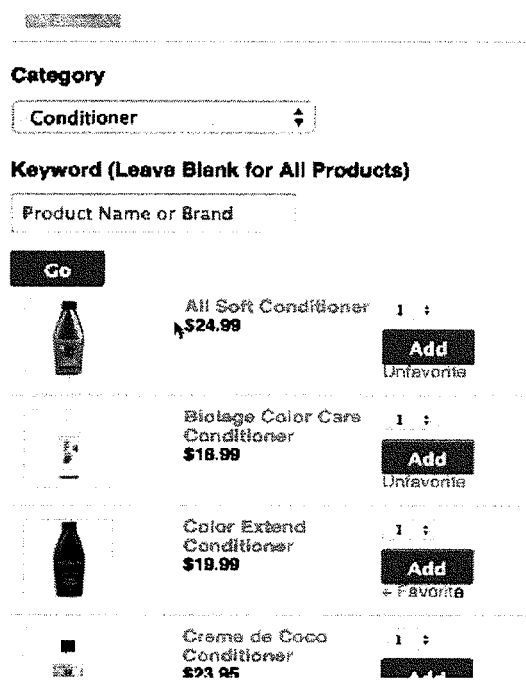
Figure 8:
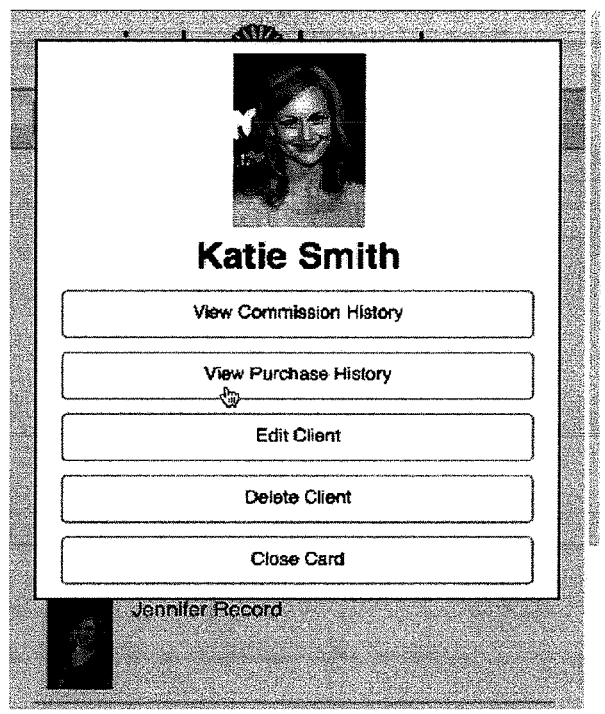
Figure 10:
Figure 11:
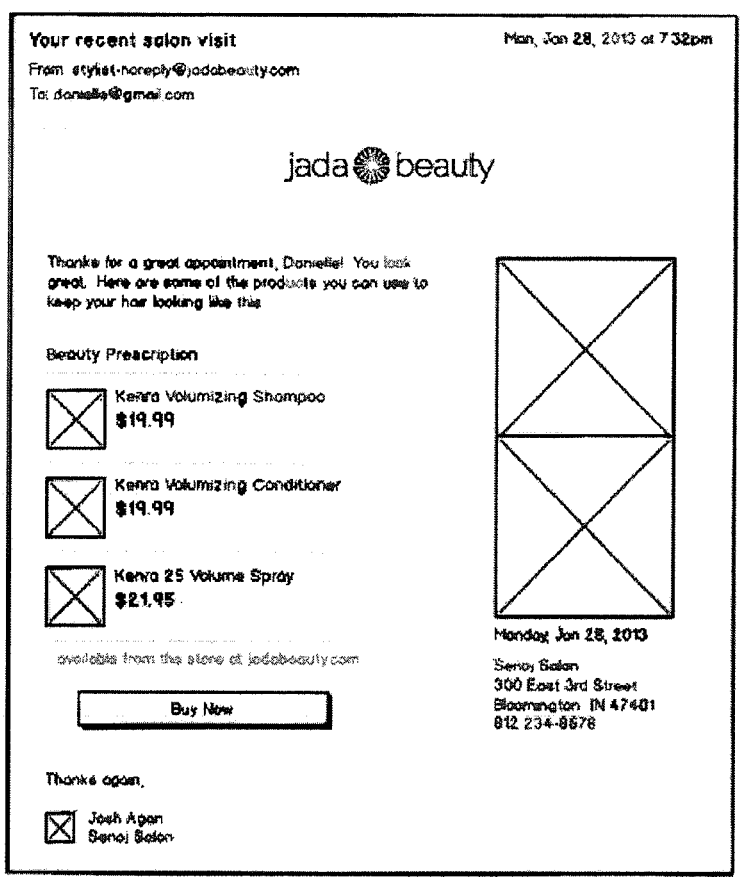
Figure 13:
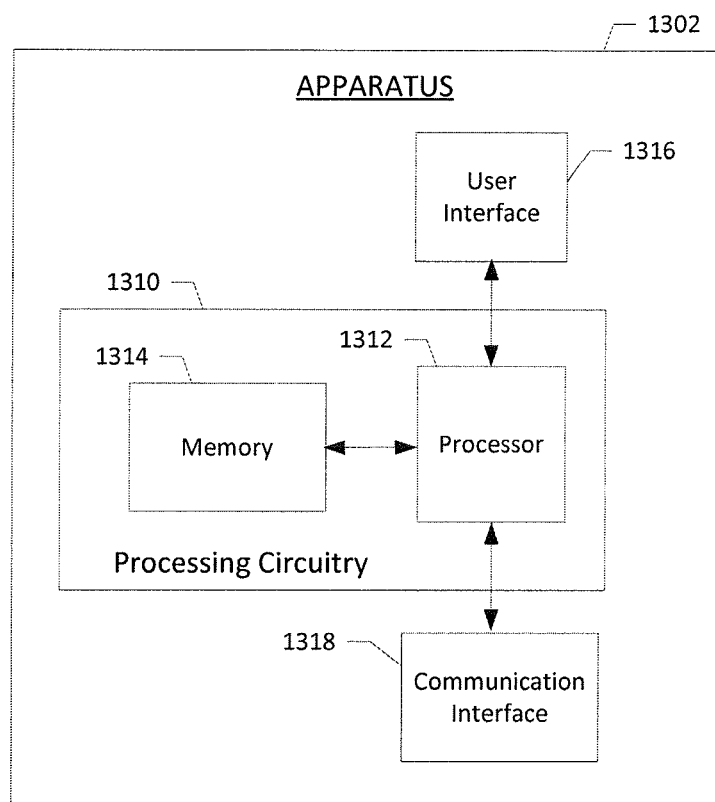

Having thus described certain embodiments of the invention in general terms, reference will now be made to the accompanying drawings, which are not necessarily drawn to scale, and wherein:

FIG. 1 illustrates a flow chart of an example process for facilitating communication between a merchant and a consumer in accordance with some embodiments of the present invention;

FIG. 2 illustrates an example system for facilitating communication between a merchant and a consumer in accordance with some embodiments of the present invention;

FIG. 3 illustrates an example interface for registering with a merchant/consumer communication system in accordance with some embodiments of the present invention;

FIG. 4 illustrates an example interface for interacting with a merchant/consumer communication system in accordance with some embodiments of the present invention;

FIGS. 5-7 illustrate example interfaces for providing merchant/consumer interaction in accordance with some embodiments of the present invention;

Figure 9:
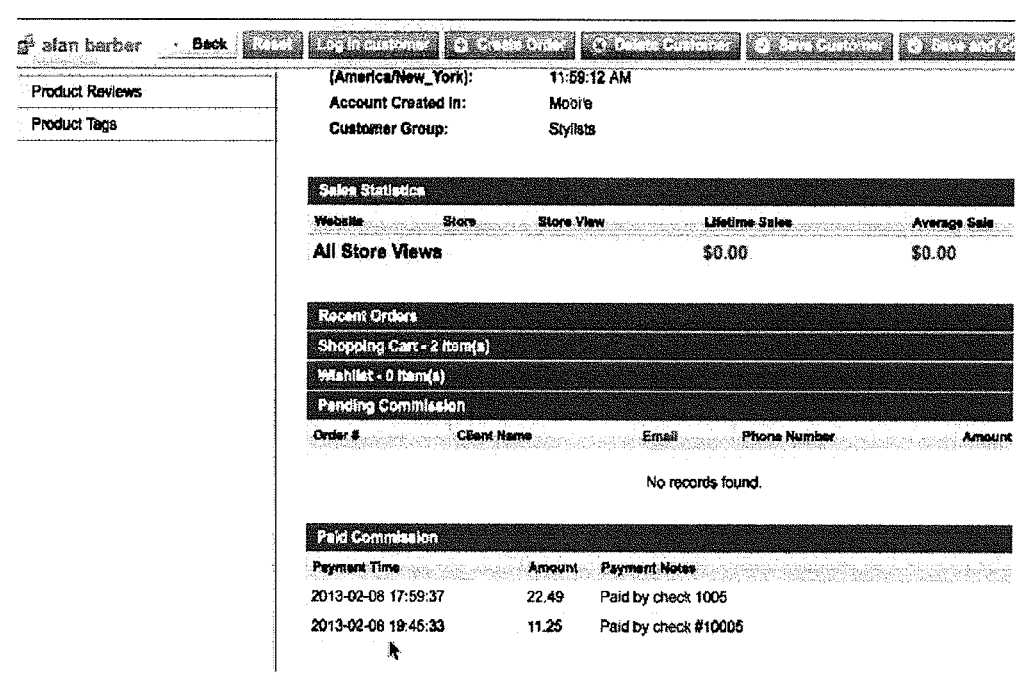

FIGS. 8-10 illustrate example interfaces for viewing merchant/consumer interaction reports in accordance with some embodiments of the present invention;

FIG. 11 illustrates an example communication generated by a merchant/consumer communication system in accordance with some embodiments of the present invention;

Figure 12:
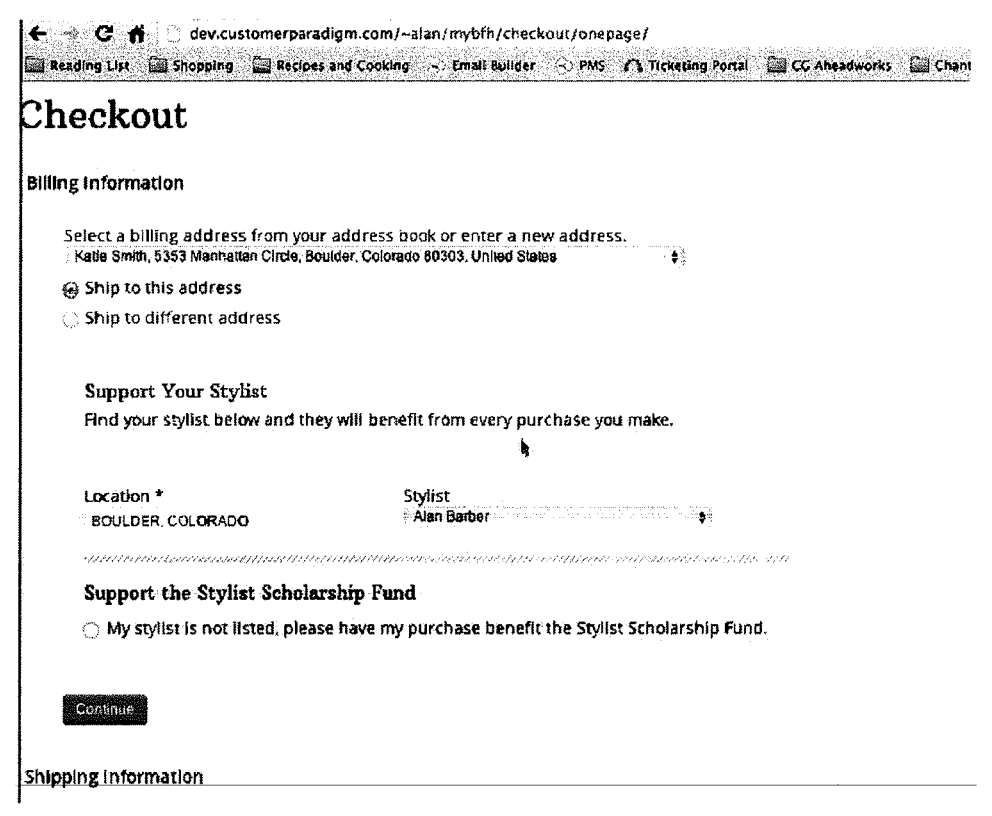

FIG. 12 illustrates an example interface depicting an e-commerce interaction by a consumer utilizing a relationship established using a merchant/consumer communication system in accordance with some embodiments of the present invention; and FIG. 13 illustrates an example apparatus for providing a merchant/consumer communication system in accordance with some embodiments of the present invention.

DETAILED DESCRIPTION

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

Referring now to FIG. 1, a flowchart of a method 100 for activity summary and product promotion is shown according to at least one embodiment of the present disclosure. As shown in FIG. 1, the method 100 includes registering a beautician in step 101, engaging a client in step 102, identifying services and products used in step 103, scheduling an appointment in step 104, receiving payment for services in step 105, creating a prescription in step 106, delivering a prescription in step 107, and tracking results in step 108. It should be appreciated that the steps shown in the method 100 shown in FIG. 1 exhibit at least one embodiment according to the present disclosure that some of the steps are not required and some steps may be added that are not shown in the method 100. The method 100 may be performed by a merchant/consumer communication system which may be embodied as an apparatus or system for facilitating merchant/consumer communication. An example of such an apparatus is described further below with respect to FIG. 13.

In at least one embodiment of the present disclosure, a beautician registers an account for the beautician and/or the beautician's salon through a beauty prescription and tracking system in step 101. In such an embodiment, the beautician accesses a registration page or application and fills in details about the beautician, the beautician's salon, and other information that may be pertinent to provide services and sell products. Information provided by the beautician in step 101 may include, but is not limited to, the address of the beautician's salon, the name of the salon, the phone number of the salon, the name of the beautician, a photo of the beautician, an email address, a mobile phone number, a biography or profile information of the beautician, the products that the beautician sells, a username, a password, areas of expertise, personal photo of the beautician, cosmetology license number, a completed W-9 form, ACH account information, whether the beautician is independent or affiliated with a salon, and other information.

It should be appreciated that it is within the scope of the present disclosure for the registration page or application to be presented to the beautician in a variety of ways, including through the use of a beauty prescription and tracking system. In at least one embodiment of the present disclosure, the beautician may access a web portal offered as a software as a service product over the Internet through a computer, laptop, tablet, smartphone or other Internet-capable device to perform steps of the method 100, including registration in step 101. In at least one embodiment of the present disclosure the beautician may access locally installed software on a computer, laptop, tablet, smartphone or other computing device and the locally installed software may provide the functionality described in some or all of the steps disclosed in the method 100. In at least one embodiment of the present disclosure, the beautician may access a registration page in step 101 through a mobile phone application, such as, for example, an iOS or Google Android application.

In at least one embodiment of the present disclosure, the beautician creates an account during registration in step 101. In such an embodiment, the account provides the beautician with a username and password to access services and enables some or all of the functionality described herein. An example registration page is shown in FIG. 3. An example graphical user interface to a beauty prescription and tracking system from a mobile device is shown in FIG. 4.

In at least one embodiment of the present disclosure, a beautician engages a client in step 102. In such an embodiment, a beautician performs services, sells products, or otherwise interacts with a client according to the standard practice in the beautician's industry, such as, for example, by providing a haircut, eyebrow trim and wax, massage, waxing, makeover and other activities performed in a salon or within the beauty industry. In addition to the foregoing in at least one embodiment of the present disclosure, the beautician further engages the client by providing information about the client within a beauty prescription and tracking system in step 102. Information provided by the beautician about the client may include, but is not limited to, the client's name, age, sex, hair color, hair style, email address, mobile phone number, social media presence information (i.e. Facebook, Twitter handle, Pinterest account), and other identifying information. In at least one embodiment of the present disclosure, the beautician may also take a photograph of the client to include as information in step 102.

In at least one embodiment of the present disclosure, the beautician accesses the beauty prescription and tracking system to populate information about the client. In an exemplary embodiment, the beautician may access the beauty prescription and tracking system through the use of a smartphone, such as, for example, through use of a mobile application installed on the smartphone or a web browser. In such an embodiment, the beautician is able to obtain and provide information about the client while providing the services to the client or shortly thereafter.

For example, a hair stylist opening a new salon in downtown Indianapolis registers her salon by providing the salon's name, location, phone number, and email address to an online beauty prescription and tracking system available over the Internet. In this example, the beautician creates a username and password that is general to the salon and installs a mobile application on her iPhone to access the beauty prescription and tracking system directly from her phone.

In this example, the salon's first customer arrives and requests a simple haircut. While performing the haircut, the hair stylist asks the customer for his name, age, email address, and mobile phone number. In this example, the hair stylist loads the application to access the beauty prescription and tracking system on her smartphone, inputs her username and password for the salon, and creates a record for the client by inputting this information and the information that the hair stylist is able to ascertain about the client, such as, for example, his sex, hair color, and hair style. In addition, the hair stylist takes a photograph from her smartphone of the customer and uploads it through the mobile application. In this example, the hair stylist is able to perform these tasks while cutting the client's hair, waiting for the client's hair to dry after a shampoo, or at any time throughout the period in which the client is within the salon receiving services. In this example, the hair stylist has registered her salon, as described in step 101, and has engaged the client, as described in step 102.

In at least one embodiment of the present disclosure, the services and products used are identified in step 103. In at least one embodiment of the present disclosure, when engaging with a client in the provision of beauty services, a beautician may use one or more products and provide one or more services. Products used may include, but are not limited to, the common set of products available in a salon, such as, for example, lotions, waxes, shampoos, conditioners, styling products (gels, creams, paste), shaving cream, massage oils, and other types of products generally provided by and/or used by a salon or a beautician in the provision of beauty services. Service provided by a beautician may include, but are not limited to, the common set of services available in a salon, such as, for example, a massage, haircut, waxing, hair styling, eyebrow trim, pedicure, manicure, and other activities.

In at least one embodiment of the present disclosure, the beautician identifies the types of services used when engaging with the client and the types of products used for the client in step 103. In at least one embodiment of the present disclosure, the beautician provides a listing of products and services consumed by the client during engagement to the beauty prescription and tracking system. In an exemplary embodiment, the beautician associates the products and services consumed by the client with the record created for the client in step 102 and the beautician may associate such products and services with the date in which the client was engaged. It should be appreciated, therefore, that the beauty prescription and tracking system may create a record of all services performed on the client and all products used by the client during engagement with the beautician and/or the salon for a specific visit in step 103.

In at least one embodiment of the present disclosure, the next appointment is scheduled in step 104. In such an embodiment, a client may be interested in scheduling a future appointment with a beautician and/or salon. In such an embodiment, a beautician and/or salon will interact with the client to schedule the appointment, and the next appointment may be provided to a beauty prescription and tracking system in step 104. In at least one embodiment of the present disclosure, the beauty prescription and tracking system may present a beautician with a calendar to select a date and time for the client's next appointment. In at least one embodiment of the present disclosure, the beauty prescription and tracking system will present a list of services for the beautician to collect to associate with the appointment. In such an embodiment, the beauty prescription and tracking system may associate a length of time for any selected service to the appointment (i.e., 1 hour for a haircut) to block off the schedule for that length of time and/or allow the beautician to manually enter a time for the length of the appointment. In at least one embodiment of the present disclosure, the beauty prescription and tracking system may associate the client's next appointment with the record for the client in step 104.

In at least one embodiment of the present disclosure, the beauty prescription and tracking system may suggest a future appointment for the client to the beautician based on the past history of appointments scheduled for the client, services utilized by the client, and/or products used by the client. For example, if a client visits a salon every three weeks, the beauty prescription and tracking system may suggest to the beautician that the client's next appointment occur three weeks from the date in which the beautician engaged the client in step 102. In this example, the beautician may select the suggested date, and the beauty prescription and tracking system will create an entry for the client's next appointment in step 104.

In at least one embodiment of the present disclosure, a client may sign an invoice and receive a receipt of payment in step 105. In such an embodiment, the client may sign a printed out invoice or receipt that indicates an amount paid, payment type, date of payment, and services and products consumed. In an exemplary embodiment, the client signs directly on a smartphone, tablet, or other touch-screen device used by the beautician to access the beauty prescription and tracking system. In such an embodiment, the client's signature is uploaded to the beauty prescription and tracking system and/or a third party payment processor as indication of the client's acceptance of the payment in step 105.

In at least one embodiment of the present disclosure, the client may provide payment in step 105. In at least one embodiment of the present disclosure, the beautician may collect payment from the client directly through interaction with the beauty prescription and tracking system, such as, for example, through a computer, smartphone, or other computing device. In an exemplary embodiment, the beautician collects payment through a smartphone which access the beauty prescription and tracking system available over the Internet. In such an embodiment, the beautician may input payment information by manually entering in credit card information or using an attachment to the smartphone that can read credit cards. In such an embodiment, the payment information is sent to the beauty prescription and tracking system and/or a third party payment processor and credited to the client's account with the salon as indication of payment in step 105. In at least one embodiment of the present disclosure, the beauty prescription and tracking system presents a list of services and products for the beautician to select during the payment process. In such an embodiment, the beautician selects from the presented products and services based on what the client used and what to bill the client.

In at least one embodiment of the present disclosure, the beauty prescription and tracking system does not collect any payment information and, instead, passes information directly to a third party payment processor. In such an embodiment, the beauty prescription and tracking system collects a record that payment was successfully processed by the third party payment processor and attaches a credit to the client's record within the beauty prescription and tracking system.

In at least one embodiment of the present disclosure, the beauty prescription and tracking system creates a prescription for the client in step 106. As used in the present disclosure, a prescription is a list of products and services recommended for purchase by the client and/or selection in the client's next appointment. In at least one embodiment of the present disclosure, a prescription may include a listing of products that the beautician used on the client in step 102, the products and services identified in step 103, or a combination. In at least one embodiment of the present disclosure, the prescription is a manually configurable listing of products and/or services recommended by the beautician for purchase by the client.

In at least one embodiment of the present disclosure, a prescription may include links to e-commerce services where the client may purchase products, and the links may include referral information to designate that the beautician referred the client to the e-commerce platform. In at least one embodiment of the present disclosure, a prescription may include a direct e-commerce application for a client to purchase products directly through the beauty prescription and tracking system or a third party e-commerce solution. In such an embodiment, the prescription may include special deals, coupons, offerings, and related products for the client to consider based on the contents of the prescription.

In a preferred embodiment, a beautician may create a prescription through the beauty prescription and tracking system. In such an embodiment, the beauty prescription and tracking system may present a grouping of commonly used products and services for the beautician to include in the prescription. In such an embodiment, the beautician may create preset groups of products and services to include for clients. In at least one embodiment of the present disclosure, the beauty prescription and tracking system may enable a beautician to repeat a previously created prescription for a specific client. An example graphical user interface to create a prescription is shown in FIGS. 5, 6, and 7.

In an exemplary embodiment, a prescription includes a listing of products recommended by a beautician for a client to purchase based on the information learned by the beautician during the client's latest appointment. In such an embodiment, the prescription also may include the client's name, photograph, and other information stored within the beauty prescription and tracking system about the client. In such an embodiment, the prescription may also include additional notes from the beautician about the client's appointment and/or what the beautician learned during the client's appointment, such as, for example, that the client's hair is naturally dry.

In an exemplary embodiment, a prescription includes a link that, when visited, prepopulates an e-commerce portal shopping cart with the products included in the prescription for purchase. In such an embodiment, additional products may be added to the shopping cart and products may be removed from the shopping cart. In an exemplary embodiment, an ecommerce portal presented to a user that interacts with a link within a prescription may enable the use of reoccurring orders. In such an embodiment, the ecommerce portal will enable the selection of a reoccurring purchase on a set time, a configurable time, or an option of various times selectable by a user. In an exemplary embodiment, a user may select to be reminded to purchase the items at a later time, which may be a configurable time. In at least one embodiment of the present disclosure, a prescription may include a link or interactive application to request and/or set a future appointment.

It should be appreciated that a prescription is an individualized communication created specifically for a single client. The prescription includes various information that is relevant to the client based on the services and products consumed by the client at the hair salon. It should be appreciated, then, that the prescription will differ from client to client and, potentially, between visits for a client. For example, a prescription created for a client after a visit to a salon with very long hair may include a shampoo specifically designed for maintaining long hair. At the client's next appointment, the client may cut off all of his hair. In this example, the prescription created for the client after the client cuts off all of his hair may not include a shampoo designed for long hair and, instead, may include a hair paste for styling short hair. It should be appreciated, then, that the prescription created for a client is relevant to the client at a specific point in time. An example of a prescription is shown in FIG. 11.

In at least one embodiment of the present disclosure, a prescription is delivered to a client in step 107. In such an embodiment, the prescription may be bundled within an electronic communication to the client, such as, for example, an email, MMS, or other type of communication. In such an embodiment, the prescription may be made available on a web page, and the client may receive a link to the web page through email, SMS, MMS, QR code at the time of visiting the salon or other communication.

In at least one embodiment of the present disclosure, a client receiving a prescription will be notified that the prescription has been sent. The client may receive notification through email, SMS, MMS, or other types of communication that inform the client a prescription is available for review. In at least one embodiment of the present disclosure, the notifications to the client and/or the prescription will include web-based tracking functionality in order to verify whether the client has visited the prescription. In such an embodiment, the client may be reminded that a prescription is available for review in the event that the client does not visit the prescription within a set time (i.e. 3 days).

In at least one embodiment of the present disclosure, the results of a prescription interaction are tracked in step 108. In such an embodiment, all interactions with the prescription by the client may be tracked and stored by a beauty prescription and tracking system. Interactions tracked through the beauty prescription and tracking system may include, but are not limited to, purchases by the client, number of times the client visits the prescription, the date and time that the client visits the prescription. An example of graphical user interfaces displaying reports from interaction through prescriptions by clients is shown in FIGS. 8, 9, and 10.

In at least one embodiment of the present disclosure, the beauty prescription and tracking system will aggregate tracked information related to more than one prescription in step 108. In such an embodiment, the beauty prescription and tracking system may present reports detailing purchase trends, aggregated client demographic information, information about beauticians and salons within a system, and other information. It should be appreciated that these reports may include information that enables a beautician to analyze trends from his or her clients, amount of revenue received through the beauty prescription and tracking system, common services purchased, scheduling habits of clients, and other information.

In at least one embodiment of the present disclosure, a beautician will be compensated for products purchased through prescriptions in step 108. In at least one embodiment of the present disclosure, a beautician is compensated based on products purchased by the beautician's clients through the use of prescriptions on a commission basis. In such an embodiment, the beautician may be compensated based on a percentage of sales from the beautician's customers. In at least one embodiment of the present disclosure, a beautician is notified in the event that a prescription created by the beautician results in a purchase by a client and, therefore, in commission to the beautician. It should be appreciated, then, that the beautician is incentivized to produce and send prescriptions because the beautician may realize additional revenue based on products purchased by the beautician's clients outside of the salon and through the use of prescriptions.

Referring now to FIG. 2, an architecture diagram 200 displaying a system for activity summary and product promotion according to at least one embodiment of the present disclosure is shown. As shown in FIG. 2, the system 200 includes a first user device 201, a computer network 202, an application 203, a database 204, and a second user device 205. In such an embodiment, the application 203 may be the beauty prescription and tracking system disclosed herein, and the database 204 may store information accessed by the beauty prescription and tracking system as described herein.

For purposes of clarity, only one second user device 205 and one first user device 201 is shown in FIG. 2. However, it is within the scope of the present disclosure that the system 200 may have two or more first user devices 201 and two or more second user devices 205 operating at the same time. For example, multiple beauticians may access the application 203 over the computer network 202 and multiple clients may receive prescriptions from the application 203 over the computer network 202. In the embodiment shown in FIG. 2, first user device 201 is operated by a beautician. It should be noted that at least in one embodiment of the present disclosure, the first user device 201 may not be remote from the other components of the system 200 but may be part of or locally connected to the application 203 and/or database 204.

The first user device 201 and second user device 205 may be configured to interact with the application 203 through the computer network 202. In addition or alternatively, the first user device 201 may be configured to access and utilize a beauty prescription and tracking system hosted on application server 203. In addition or alternatively, second user device 205 may be configured to receive communications from a beauty prescription and tracking system hosted on application server 203 and/or interact with such beauty prescription and tracking system hosted on application server 203 to make purchases, schedule appointments, or perform any of the steps of the method 100 disclosed herein. Although depicted in FIG. 2 as a smartphone, first user device 201 and second user device 205 may include one or more computers, computing devices, or systems of a type well known in the art, such as a mainframe computer, workstation, personal computer, laptop computer, hand-held computer, cellular telephone, or personal digital assistant. First user device 201 comprises such software, hardware, and componentry as would occur to one of skill in the art, such as, for example, one or more microprocessors, memory systems, input/output devices, device controllers, and the like. First user device 201 and second user device 205 also comprises one or more data entry means operable by users of first user device 201 for data entry, such as, for example, a pointing device (such as a mouse), keyboard, touchscreen, microphone, voice recognition, and/or other data entry means known in the art. First user device 201 also comprises a display means which may comprise various types of known displays such as liquid crystal diode displays, light emitting diode display, and the like upon which information may be display in a manner perceptible to the user. It should be appreciated that second user device 205 may be a device similar in configuration to first user device 201.

Application server 203 may be configured to receive content and information from the first user device 201, host an application, like a beauty prescription and tracking system, for the first user device 201 to input information, create prescriptions, and generally interact therewith. In at least one embodiment, the application server 203 accesses the database 204 to store client information, production information, purchase history and other information generated through execution of the steps of the method 100. The application server 203 is configured to carry out one or more of the steps of methods described herein. For example, the application server may perform steps 101, 102, 103, 104, 105, 106, and 107 of the method 100. It should be appreciated that the application server 203 may perform any or all of the steps of the methods disclosed herein.

The first user device 201 and second user device 205 are configured to provide input to the application server 203 to carry out one or more of the steps of the methods described herein. Application server 203 comprises one or more server computers, computing devices, or systems of a type known in the art. Application server 203 further comprises such software, hardware, and componentry as would occur to one of skill in the art, such as, for example, microprocessors, memory systems, input/output devices, device controllers, display systems, and the like. Application server 203 may comprise one of many well-known servers, such as, for example, IBM's AS/400 Server, IBM's AIX UNIX Server, or MICROSOFT's WINDOWS NT Server. In FIG. 2, application server 203 is shown and referred to herein as a single server. However, application server 203 may comprise a plurality of servers or other computing devices or systems interconnected by hardware and software systems know in the art which collectively are operable to perform the functions allocated to application server 203 in accordance with the present disclosure.

The database 204 is configured to store data extensions, contact attributes, recipient demographic information, content, and other information. Database 204 is "associated with" application server 203. According to the present disclosure, database 204 can be "associated with" application server 203 where, as shown in the embodiment in FIG. 2, database 204 resides on application server 203. Database 204 can also be "associated with" application server 203 where database 204 resides on a server or computing device remote from application server 203. In at least one embodiment, the remote server or computing device upon which database 204 resides is electronically connected to application server 203 such that the remote server or computing device is capable of continuous bi-directional data transfer with application server 203.

For purposes of clarity, database 204 is shown in FIG. 2, and referred to herein as a single database. It will be appreciated by those of ordinary skill in the art that database 204 may comprise a plurality of databases connected by software systems of a type well known in the art, which collectively are operable to perform the functions delegated to database 204 according to the present disclosure. Database 204 may comprise a relational database architecture or other database architecture of a type known in the database art. Database 204 may comprise one of many well-known database management systems, such as, for example, MICROSOFT's SQL Server, MICROSOFT's ACCESS, or IBM's DB2 database management systems, or the database management systems available from ORACLE or SYBASE. Database 204 retrievably stores information or documents that are communicated to database 204 from first user device 201, second user device 205, and/or application server 203.

First user device 201, second user device 205, and application server 203 may perform bidirectional communication between any two components through computer network 202. Computer network 202 may comprise the Internet, but this is not required.

FIG. 13 illustrates a block diagram of an apparatus 1302 in accordance with some example embodiments. The apparatus 1302 may be any computing device capable of facilitating communication between a merchant (e.g., a stylist) and a consumer as described herein. For example, the apparatus 1302 may be implemented on a smart phone, personal digital assistant, tablet computer, netbook computer, laptop, desktop, or server. The apparatus 1302 may be operable to enable a merchant to register a consumer with the merchant such that the consumer is provided with product recommendations offered by the merchant. In response to the consumer purchasing a product recommended by the merchant, the apparatus may facilitate association of the merchant with the consumer such that the merchant receives any commissions derived from the purchase. The apparatus may also facilitate the transmission of messages, product recommendations, product usage instructions, appointment information, from the merchant to the consumer. Accordingly, it will be appreciated that the apparatus 1302 may comprise an apparatus configured to implement and/or otherwise support implementation of various example embodiments described herein. For example, the apparatus 1302 may be operable to perform the method 100 as described above with respect to FIG. 1. As another example, the apparatus 1302 may act as one or more elements of the system described with respect to FIG. 2.

It should be noted that the components, devices or elements illustrated in and described with respect to FIG. 13 below may not be mandatory and thus some may be omitted in certain embodiments. Additionally, some embodiments may include further or different components, devices or elements beyond those illustrated in and described with respect to FIG. 1.

The apparatus 1302 may include or otherwise be in communication with processing circuitry 1310 that is configurable to perform actions in accordance with one or more example embodiments disclosed herein. In this regard, the processing circuitry 1310 may be configured to perform and/or control performance of one or more functionalities of the apparatus 1302 (e.g., functionalities of a computing device on which the apparatus 1302 may be implemented) in accordance with various example embodiments, and thus may provide means for performing functionalities of the apparatus 1302 (e.g., functionalities of a computing device on which the apparatus 1302 may be implemented) in accordance with various example embodiments. The processing circuitry 1310 may be configured to perform data processing, application execution and/or other processing and management services according to one or more example embodiments. In some embodiments, the apparatus 1302 or a portion(s) or component(s) thereof, such as the processing circuitry 1310, may be embodied as or comprise a chip or chip set. In other words, the apparatus 1302 or the processing circuitry 1310 may comprise one or more physical packages (e.g., chips) including materials, components and/or wires on a structural assembly (e.g., a baseboard). The apparatus 1302 or the processing circuitry 1310 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 1310 may include a processor 1312 and, in some embodiments, such as that illustrated in FIG. 1, may further include memory 1314. The processing circuitry 1310 may be in communication with or otherwise control a user interface 1316 and/or a communication interface 1318. As such, the processing circuitry 1310 may be embodied as a circuit chip (e.g., an integrated circuit chip) configured (e.g., with hardware, software or a combination of hardware and software) to perform operations described herein.

The processor 1312 may be embodied in a number of different ways. For example, the processor 1312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 1312 may comprise a plurality of processors. The plurality of processors may be in operative communication with each other and may be collectively configured to perform one or more functionalities of the apparatus 1302 as described herein. The plurality of processors may be embodied on a single computing device or distributed across a plurality of computing devices collectively configured to function as the apparatus 1302. In some example embodiments, the processor 1312 may be configured to execute instructions stored in the memory 1314 or otherwise accessible to the processor 1312. As such, whether configured by hardware or by a combination of hardware and software, the processor 1312 may represent an entity (e.g., physically embodied in circuitry —in the form of processing circuitry 1310) capable of performing operations according to embodiments of the present invention while configured accordingly. Thus, for example, when the processor 1312 is embodied as an ASIC, FPGA or the like, the processor 1312 may be specifically configured hardware for conducting the operations described herein. Alternatively, as another example, when the processor 1312 is embodied as an executor of software instructions, the instructions may specifically configure the processor 1312 to perform one or more operations described herein.

In some example embodiments, the memory 1314 may include one or more non-transitory memory devices such as, for example, volatile and/or non-volatile memory that may be either fixed or removable. In this regard, the memory 1314 may comprise a non-transitory computer-readable storage medium. It will be appreciated that while the memory 1314 is illustrated as a single memory, the memory 1314 may comprise a plurality of memories. The plurality of memories may be embodied on a single computing device or may be distributed across a plurality of computing devices collectively configured to function as the apparatus 1302. The memory 1314 may be configured to store information, data, applications, instructions and/or the like for enabling the apparatus 1302 to carry out various functions in accordance with one or more example embodiments. For example, the memory 1314 may be configured to buffer input data for processing by the processor 1312. Additionally or alternatively, the memory 1314 may be configured to store instructions for execution by the processor 1312. As yet another alternative, the memory 1314 may include one or more databases that may store a variety of files, contents or data sets. Among the contents of the memory 1314, applications may be stored for execution by the processor 1312 in order to carry out the functionality associated with each respective application. In some cases, the memory 1314 may be in communication with one or more of the processor 1312, user interface 1316, or communication interface 1318 via a bus or buses for passing information among components of the apparatus 1302.

The user interface 1316 may be in communication with the processing circuitry 1310 to receive an indication of a user input at the user interface 1316 and/or to provide an audible, visual, mechanical or other output to the user. As such, the user interface 1316 may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms.

The communication interface 1318 may include one or more interface mechanisms for enabling communication with other devices and/or networks. In some cases, the communication interface 1318 may be any means such as a device or circuitry embodied in either hardware, or a combination of hardware and software that is configured to receive and/or transmit data from/to a network and/or any other device or module in communication with the processing circuitry 1310. By way of example, the communication interface 1318 may be configured to enable the apparatus 1302 to communicate with another computing device via a wireless network, such as a wireless local area network (WLAN), cellular network, and/or the like. Additionally or alternatively, the communication interface 1318 may be configured to enable the apparatus 1302 to communicate with another computing device via a wireline network. In some example embodiments, the communication interface 1318 may be configured to enable communication between the apparatus 1302 and one or more further computing devices via the internet. Accordingly, the communication interface 1318 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

It will be appreciated that the features and examples described above with respect to FIGS. 1-12 are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

While the description above refers to particular embodiments of the present invention, it will be understood that many modifications may be made without departing from the spirit thereof. The accompanying concepts are intended to cover such modifications as would fall within the true scope and spirit of the present invention. The presently disclosed embodiments are therefore to be considered in all respects illustrative and not restrictive, the scope of the invention being indicated by the appended concepts, rather than the foregoing description, and all changes which come within the meaning and range of equivalency of the concepts are therefore intended to be embraced therein.

The invention claimed is:

1. A method for providing a beauty prescription and tracking system for enabling prescription interaction, purchasing, and tracking, the method comprising:
   creating, within a beauty prescription and tracking system, a plurality of beautician accounts for a plurality of beauticians each comprising beautician identifying information about the beautician and other information pertinent to provide services and sell products, comprising products that the beautician sells;
   creating, within a beauty prescription and tracking system, a client account associated with a client comprising client identifying information, comprising at least the client's name;
   receiving, from a beautician device operating a beautician interface configured to communicate with the beauty prescription and tracking system, via a communication interface of the beauty prescription and tracking system, service information indicative of at least one service provided by the beautician to the client; prescription information indicative of at least one product recommended by the beautician to the client; and the client identifying information, based on an interaction between the beautician and the client;
   linking, within the beauty prescription and tracking system, the client account to a beautician account of the plurality of beautician accounts;
   receiving, from a beautician device operating a beautician interface, via a communication interface of the beauty prescription and tracking system, a prescription for the client the prescription comprising prescription information and client identifying information,
      wherein the prescription is unique to the client;
   linking, within the beauty prescription and tracking system, the prescription to the client account;
   generating an access link to the prescription comprising a designation of the beautician who created the prescription,
      wherein the access link provides access to the beauty and prescription tracking system via a webpage,
      wherein the access link is configured to pre-populate an e-commerce portal shopping cart of a direct e-commerce application with the products included in the prescription for purchase, and wherein the e-commerce portal shopping cart enables purchase of the products included in the prescription;

transmitting the access link to the prescription, via the communication interface on the beauty prescription and tracking system to a client device, the access link providing the client access to the prescription from the client device operating a client interface, wherein the prescription comprises the direct e-commerce application for the client to purchase products directly through the beauty prescription and tracking system;

tracking, via web-based functionality, the client's interaction with the prescription created by the beautician, wherein the client's interaction comprises at least one of: (1) purchases of the products included in the prescription by the client, (2) a number of times the client visits the prescription, and (3) a date and a time that the client visits the prescription;

aggregating, via a database interface providing access to a beauty prescription and tracking system database, aggregated data comprising the beautician identifying information, the client identifying information, the information indicative of at least one product recommended by the beautician, and the client's interaction with the prescription;

linking, to the beautician account within the beauty prescription and tracking system, a report comprising the aggregated data; and compensating the beautician associated with the beautician account based on one or more purchases by the client of at least one of the one or more products recommended for purchase in the prescription.

2. The method of claim 1, wherein the prescription further comprises a referral information link, the method further comprising: upon selection of the link, designating that the beautician referred the client to the direct e-commerce application.

3. The method of claim 1, wherein the communication further comprises at least one interface control that, when selected by the client, facilitates setting of a future appointment for the client with the beautician.

4. The method of claim 3, further comprising: storing the interaction with the prescription by the client within the beauty prescription and tracking system.

5. The method of claim 1, further comprising:
creating a client identification record for the client; and
in response to receiving the information related to the interaction, linking the client identification record to the beautician account.

6. The method of claim 5, wherein the client identification record comprises at least one photograph of the client's hair style.

7. The method of claim 1, wherein the communication comprises a prescription for using the at least one product or service.

8. An apparatus for providing a beauty prescription and tracking system for enabling prescription interaction, purchasing, and tracking, the apparatus comprising a processor coupled to a memory, wherein the memory comprises instructions that, when executed by the processor, configure the apparatus to:

create, within a beauty prescription and tracking system, a plurality of beautician accounts for a plurality of beauticians each comprising beautician identifying information about the beautician and other information pertinent to provide services and sell products, comprising products that the beautician sells;

create, within a beauty prescription and tracking system, a client account associated with a client comprising client identifying information, comprising at least the client's name;

receive, from a beautician device operating a beautician interface configured to communicate with the beauty prescription and tracking system, via a communication interface of the beauty prescription and tracking system, service information indicative of at least one service provided by the beautician to the client; prescription information indicative of at least one product recommended by the beautician to the client; and the client identifying information, based on an interaction between the beautician and the client;

link, within the beauty prescription and tracking system, the client account to the beautician account of the plurality of beautician accounts;

receive, from a beautician device operating a beautician interface, via a communication interface of the beauty prescription and tracking system, a prescription for the client the prescription comprising prescription information and client identifying information,
wherein the prescription is unique to the client;

link, within the beauty prescription and tracking system, the prescription to the client account;

generate an access link to the prescription comprising a designation of the beautician who created the prescription,
wherein the access link provides access to the beauty and prescription tracking system via a webpage,
wherein the access link is configured to pre-populate an e-commerce portal shopping cart of a direct e-commerce application with the products included in the prescription for purchase, and
wherein the e-commerce portal shopping cart enables purchase of the products included in the prescription;

transmit the access link to the prescription, via the communication interface on the beauty prescription and tracking system to a client device, the access link providing the client access to the prescription from the client device operating a client interface, wherein the prescription comprises the direct e-commerce application for the client to purchase products directly through the beauty prescription and tracking system;

track, via web-based functionality, the client's interaction with the prescription created by the beautician, wherein the client's interaction comprises at least one of: (1) purchases of the products included in the prescription by the client, (2) a number of times the client visits the prescription, and (3) a date and a time that the client visits the prescription;

aggregate, via a database interface providing access to a beauty prescription and tracking system database, aggregated data comprising the beautician identifying information, the client identifying information, the information indicative of at least one product recommended by the beautician, and the client's interaction with the prescription;

link, to the beautician account within the beauty prescription and tracking system, a report comprising the aggregated data; and compensate the beautician associated with the beautician account based on one or more purchases by the client of at least one of the one or more products recommended for purchase in the prescription.

9. The apparatus of claim 8, wherein the prescription further comprises a referral information link, the apparatus further configured to: upon selection of the link, designate that the beautician referred the client.

10. The apparatus of claim 8, wherein the communication comprises at least one interface control that when selected by the client, facilitates setting of a future appointment for the client with the beautician.

11. The apparatus of claim 10, further comprising: storing the interaction with the prescription by the client within the beauty prescription and tracking system.

12. The apparatus of claim 8, further configured to:
create a client identification record for the client; and
in response to receiving the information related to the interaction, link the client identification record to the beautician account.

13. The apparatus of claim 12, wherein the client identification record comprises at least one photograph of the client's hair style.

14. The apparatus of claim 8, wherein the communication comprises a prescription for using the at least one product or service.

15. A non-transitory computer readable storage medium providing a beauty prescription and tracking system for enabling prescription interaction, purchasing, and tracking, comprising instructions that, when executed by a processor, cause the processor to configure an apparatus to:
create, within a beauty prescription and tracking system, a plurality of beautician accounts for a plurality of beauticians each comprising beautician identifying information about the beautician and other information pertinent to provide services and sell products, comprising products that the beautician sells;
create, within a beauty prescription and tracking system, a client account associated with a client comprising client identifying information, comprising at least the client's name;
receive, from a beautician device operating a beautician interface configured to communicate with the beauty prescription and tracking system, via a communication interface of the beauty prescription and tracking system, service information indicative of at least one service provided by the beautician to the client; prescription information indicative of at least one product recommended by the beautician to the client; and the client identifying information, based on an interaction between the beautician and the client;
link, within the beauty prescription and tracking system, the client account to the beautician account of the plurality of beautician accounts;
receive, from a beautician device operating a beautician interface, via a communication interface of the beauty prescription and tracking system, a prescription for the client the prescription comprising prescription information and client identifying information,
wherein the prescription is unique to the client;
link, within the beauty prescription and tracking system, the prescription to the client account;
generate an access link to the prescription comprising a designation of the beautician who created the prescription,
wherein the access link provides access to the beauty and prescription tracking system via a webpage,
wherein the access link is configured to pre-populate an e-commerce portal shopping cart of a direct e-commerce application with the products included in the prescription for purchase, and
wherein the e-commerce portal shopping cart enables purchase of the products included in the prescription;
transmit the access link to the prescription, via the communication interface on the beauty prescription and tracking system to a client device, the access link providing the client access to the prescription from the client device operating a client interface, wherein the prescription comprises the direct e-commerce application for the client to purchase products directly through the beauty prescription and tracking system;
track, via web-based functionality, the client's interaction with the prescription created by the beautician, wherein the client's interaction comprises at least one of: (1) purchases of the products included in the prescription by the client, (2) a number of times the client visits the prescription, and (3) a date and a time that the client visits the prescription;
aggregate, via a database interface providing access to a beauty prescription and tracking system database, aggregated data comprising the beautician identifying information, the client identifying information, the information indicative of at least one product recommended by the beautician, and the client's interaction with the prescription;
link, to the beautician account within the beauty prescription and tracking system, a report comprising the aggregated data; and
compensate the beautician associated with the beautician account based on one or more purchases by the client of at least one of the one or more products recommended for purchase in the prescription.

16. The computer readable medium of claim 15, wherein the prescription further comprises a referral information link, the computer readable medium further configured to: upon selection of the link, designate that the beautician referred the client to the direct e-commerce application.

17. The method of claim 1, wherein the beautician identifying information further comprises the salon affiliation of the beautician.

18. The method of claim 1, wherein the aggregated data further comprises information indicative of at least one service provided by the beautician.

19. The apparatus of claim 8, wherein the beautician identifying information further comprises the salon affiliation of the beautician.

20. The apparatus of claim 8, wherein the aggregated data further comprises information indicative of at least one service provided by the beautician.

* * * * *